ELECTROLUMINESCENT DEVICE

Filed July 13, 1955

INVENTOR:
EGON E. LOEBNER
BY Laurence Burns,
ATTORNEY.

2,817,783
Patented Dec. 24, 1957

2,817,783

ELECTROLUMINESCENT DEVICE

Egon E. Loebner, Arlington, Mass., assignor to Sylvania Electric Products Inc., Salem, Mass., a corporation of Massachusetts Application July 13, 1955, Serial No. 521,776
6 Claims. (Cl. 313—108)

This invention relates to electroluminescent devices and particularly to such devices utilizing junction barriers across which electropositive holes are injected to produce light on recombination with electrons, either directly or through trapping states.

An object of the invention is the production of light by such a process.

A further object is the control of the light so produced. The control can best be achieved by the use of the so-called "field effect," but can also be achieved by direct conductive effect if desired.

In one embodiment of the invention, a barrier is established at a junction between two crystal regions, one of which has a larger concentration of positive current-carriers such as holes than the other region. An electric field applied to the more positive-carrier material transverse to the direction of current flow, as in field-effect transistors, controls the hole current and hence the number of holes injected across the barrier into the negative-carrier region. The field controls the current by narrowing the stream of holes.

Control can also be achieved by having a pair of barriers between three crystal regions, with a connection to each of the outside crystal regions and one to the inside region.

Multiple barriers with a larger number of crystal regions can also be used.

Figure 1:
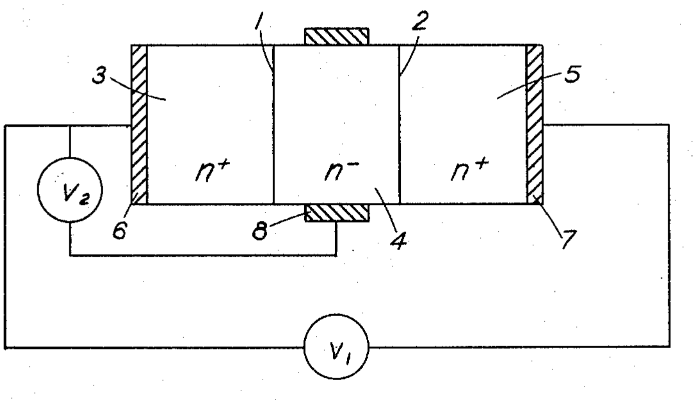
Figure 2:
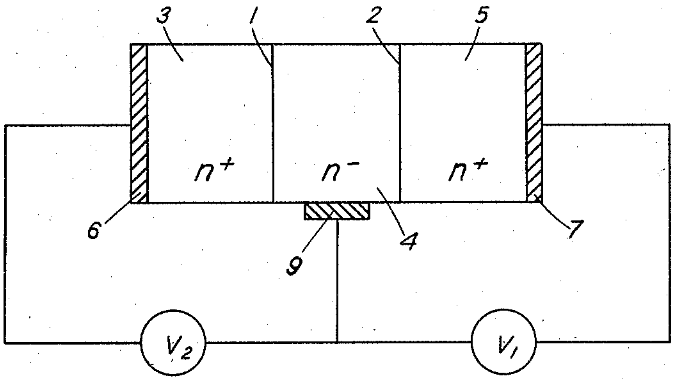

Other objects, features and advantages of the invention will be apparent from the following specification, taken in connection with the attached drawing in which:

Fig. 1 is an electroluminescent device in which field-effect control is used; and Fig. 2 is another device according to the invention.

In Fig. 1, a crystal of zinc sulfide or the like has two barriers 1, 2, which divide the crystal into three parts 3, 4, 5, parts 3 and 5 being of the $n^+$ type, that is of zinc sulfide having a larger concentration of electrons as charge carriers than of holes, and part 4 being of the $n^-$ type, having a greater concentration of holes, as carriers. The usual type of potential barrier exists at a junction of such electrically dissimilar materials.

Ohmic contacts 6, 7, of types well-known in the art are provided at the outside ends of the $n^+$ parts of the crystal, and a voltage connected between said ends. An ohmic contact 8 in the form of a ring is provided around the $n^-$ region 4, in the manner of so-called "field effect" transistors, and the ring contact 8 is connected to the corresponding ohmic end contact 6 through a proper voltage V. This voltage can be the modulating voltage, for its magnitude will determine the hole current through the region 4, and hence the rate of hole travel in that region, and consequently the amount of light, which will be dependent on the number of holes arriving at the barrier 1. The voltage $V_2$ will thus be an alternating voltage or a varying direct current voltage. The voltage $V_1$ can be a direct current voltage, or an alternating voltage of a frequency out of the range of the modulating voltage $V_2$.

The second region 5 can be omitted if desired, when "field effect" modulation is used, especially if the voltage $V_2$ is an unidirectional source.

In the circuit of Figure 2, the second $n^+$ portion 5 is necessary, however. In that case, another ohmic contact 9 is made to the side of the $n^-$portion, and the modulating voltage $V_2$ applied between electrodes 6 and 9. The fixed voltage V, is applied between electrodes 9 and 7.

Instead of the junction shown, an $n$ to $i$ to $n$ junction can be used. The symbol $i$ refers to an intrinsically semi-conducting portion, that is a portion in which semi-conduction occurs by raising an electron from the valence band to the conduction band directly. The $n$ can then be either $n^+$ or $n^-$.

Voltage barriers are found in materials which contain added donor or acceptor impurities, and in materials which do not contain such impurities. For example, in many metal sulfides, for example, such as those of lead, cadmium and zinc, electrical conduction can occur because of a deficiency in the anion or the cation, that is, because of the presence of anion or cation vacancies, for example cadmium or sulfur vacancies in cadmium sulfide.

Such vacancies can be produced in localized regions by varying the temperature non-uniformly, varying the partial pressures of the components, or in other ways. If in preparing zinc sulfide, the partial pressure of the zinc component is higher than the stoichiometric equilibrium value, the vacancies will be sulfur ions, and vice versa.

If the conditions are such that there is a transition from a region having zinc vacancies to one having sulfur vacancies in a sufficiently short distance, a voltage barrier will exist. A barrier will also exist across a thin crystal portion of an insulating nature sandwiched between two conducting portions.

In particular, one region of a zinc sulfide crystal, or a continuous layer of zinc sulfide deposited on a surface, can be either self-activated or activated by one of the usual substances such as copper, silver or manganese, can have in contact therewith a region or a layer of zinc sulfide having a deficiency of zinc, and over that a region or layer of zinc sulfide having a deficiency of sulfide, and vice versa. There will then be an electroluminescent junction between the activated material and the layer over it.

Although for convenience in the foregoing, the holes are referred to as having a greater concentration than the electrons in one region, and the reverse in another, it is to be understood that it is merely necessary that the concentration of holes be greater in one region than in another. And although one particular type of field-effect electrode is shown, other types known in the transistor art can be used.

Instead of using a voltage to control the light emission, I can use ultraviolet, visible or other forms of irradiation for that purpose.

Although particular embodiments have been described herein, various modifications may be made without departing from the spirit and scope of the invention.

What I claim is:

1. An electroluminescent device comprising an electroluminescent crystal having a portion in which the majority of the carriers are positive and a region in which the majority of the carriers are negative so that holes can be injected from the positive region into the negative region, and means for controlling the number of holes passing through the positive region for injection into the negative region, the specified regions of said crystal being in the form of a chemical compound of at least two different elements.

2. An electroluminescent device comprising an electroluminescent crystal having a portion in which the majority of carriers are positive and a region in which the majority of the carriers are predominantly negative, so that holes can be injected into the negative region from the positive region, and a field-effect electrode in controlling relationship to the positive region to control the number of holes passing through that region for injection into the other region, whereby the luminescence is controlled by said electrode, the specified regions of said crystal being in the form of a chemical compound of at least two different elements.

3. An electroluminescent device comprising an electroluminescent crystal having two joined regions, each having a different ratio of positive to negative current carriers, and means for controlling the rate at which holes travel through one region for injection into the other, the specified regions of said crystal being in the form of a chemical compound of at least two different elements.

4. An electroluminescent device comprising an electroluminescent crystal having two joined regions, one of said regions having a greater concentration of holes than the other, and means for controlling the rate at which holes travel through said region for injection into the other region, the specified regions of said crystal being in the form of a chemical compound of at least two different elements.

5. An electroluminescent device comprising an electroluminescent crystal having two joined regions, one of said regions having a greater concentration of holes than the other, and field-effect means for controlling the rate at which holes travel through said region for injection into the other region, the specified regions of said crystal being in the form of a chemical compound of at least two different elements.

6. An electroluminescent device comprising an electroluminescent zinc sulfide crystal having two joined regions, one of said regions having an excess of zinc atoms, and the other an excess of sulfur atoms, and means for controlling the rate at which current carriers travel through that region for injection into the other region.

References Cited in the file of this patent

UNITED STATES PATENTS

| | | |
|---|---|---|
| 2,569,347 | Shockley | Sept. 25, 1951 |
| 2,655,625 | Burton | Oct. 13, 1953 |

OTHER REFERENCES

Transient Analysis of Transistor Amplifiers, by W. F. Chow and J. J. Suran, Nov. 1953, pp. 189–192.

Transistors from N to P-Electronics, by George Fletcher Cooper, July 1954, pp. 77 to 81.